(12) United States Patent
Shyu et al.

(10) Patent No.: US 7,944,630 B2
(45) Date of Patent: May 17, 2011

(54) LENS HOLDER FOR STACKED LENS MODULE AND MANUFACTURING METHOD THEREOF

(75) Inventors: San-Woei Shyu, Taipei (TW);
Huang-Chang Chen, Taipei (TW);
Chih-Peng Wang, Taipei (TW);
Te-Cheng Lin, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/557,295

(22) Filed: Sep. 10, 2009

(65) Prior Publication Data
US 2010/0328788 A1 Dec. 30, 2010

(30) Foreign Application Priority Data
Jun. 30, 2009 (TW) .............................. 98122150 A (51) Int. Cl.
*G02B 7/02* (2006.01)
*G02B 15/14* (2006.01)
*B29D 11/00* (2006.01)

(52) U.S. Cl. .......... 359/818; 359/819; 359/694; 264/2.5

(58) Field of Classification Search .......... 359/694–704, 359/811–824; 264/2.5, 1.4, 1.5
See application file for complete search history.

(56) References Cited

U.S. PATENT DOCUMENTS

| | | | |
|---|---|---|---|
| 5,923,805 A | 7/1999 | Anderson et al. | |
| 6,710,945 B1 * | 3/2004 | Miranda | 359/819 |
| 6,825,503 B2 | 11/2004 | Huang | |
| 7,095,572 B2 * | 8/2006 | Lee et al. | 359/808 |
| 7,221,524 B2 * | 5/2007 | Ye et al. | 359/819 |
| 7,224,542 B2 | 5/2007 | Kuchimaru | |
| 7,312,933 B2 | 12/2007 | Shyu et al. | |
| 7,332,110 B2 | 2/2008 | Inoue et al. | |
| 7,471,464 B2 * | 12/2008 | Kageyama | 359/699 |
| 7,768,724 B2 * | 8/2010 | Tsai et al. | 359/819 |
| 2007/0024989 A1 | 2/2007 | Kageyama | |
| 2007/0047109 A1 | 3/2007 | Shibata et al. | |
| 2009/0059398 A1 | 3/2009 | Tsai et al. | |

FOREIGN PATENT DOCUMENTS

| | | |
|---|---|---|
| JP | 62251113 | 10/1987 |
| JP | 06258562 | 9/1994 |
| JP | 07120610 | 5/1995 |
| JP | 3650594 | 2/2003 |
| JP | 3791615 | 4/2005 |
| TW | 0528279 | 4/2002 |
| TW | M337077 | 3/2006 |
| TW | M313317 | 12/2006 |

* cited by examiner

*Primary Examiner* — Mohammed Hasan
(74) *Attorney, Agent, or Firm* — Muncy, Geissler, Olds & Lowe, PLLC (57) ABSTRACT

A lens holder of a stacked lens module and a manufacturing method thereof are revealed. A stacked lens submodule is used as a molded molding insert to be set into a mold cavity. The molding insert is aligned in the alignment fixture and the clamp of the mold by injection molding or press molding. After molding process, a lens module included the stacked lens submodule as well as the lens holder is formed. Thereby the manufacturing method of conventional lens assemblies or lens modules is improved. Moreover, the processes are simplified and the yield rate is increased. Furthermore, the molded lens module is packed into the lens more easily so that it is suitable to be applied to camera lenses, small lenses and mobile phone lenses.

6 Claims, 8 Drawing Sheets

LENS HOLDER FOR STACKED LENS MODULE AND MANUFACTURING METHOD THEREOF

BACKGROUND OF THE INVENTION

The present invention relates to a lens holder of a stacked lens module and a manufacturing method thereof, being applied to assembling of the stacked lens submodule with the lens holder and suitable for applications in camera lenses, small lenses, and mobile phone lenses.

Figures 1, 2:
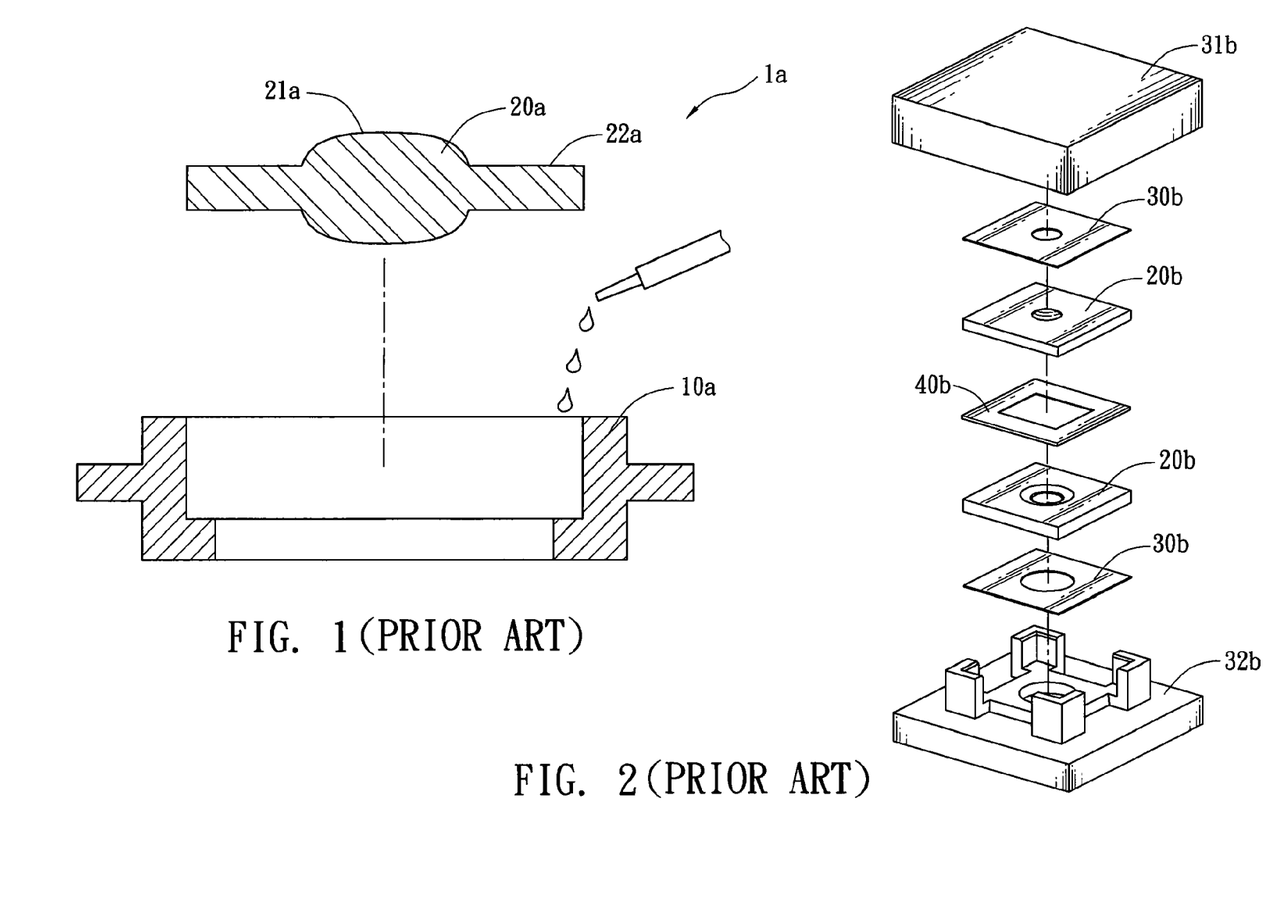
FIG. 1 is a schematic view of a first conventional lens holder.
FIG. 2 is a schematic view of a second conventional lens holder.
Figure 3:
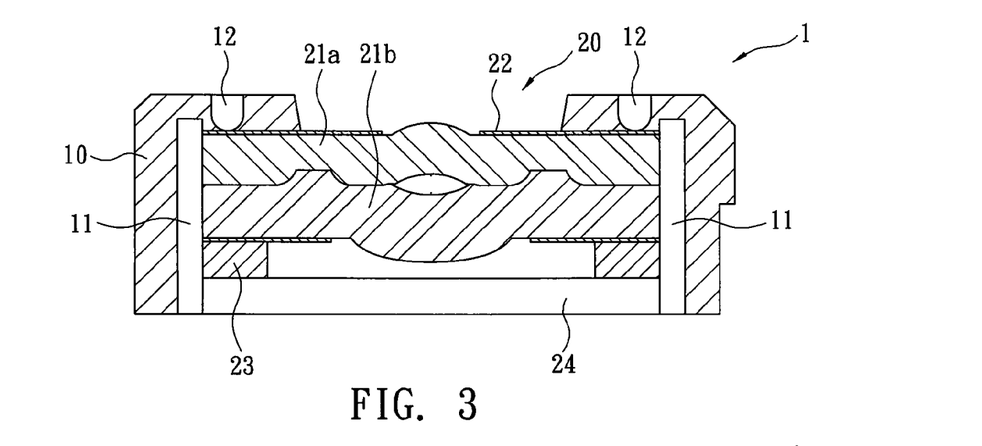
FIG. 3 is a cross sectional view of an embodiment applied to a rectangular stacked lens module of camera lenses according to the present invention.

The optical lens module is a compact optical element in cameras or lenses of camera phones. In practice, the optical lens module is assembled by at least one optical lens. Refer to FIG. 1, an optical lens 20a is made from optical plastic material or optical glass and having an optical surface 21a that generally is a round surface, and an outer periphery 22a around the optical surface 21a that can be round or rectangular. In order to assemble and package the optical lens 20a inside a optical lens module, the optical lens 20a is located and assembled in a holding ring (or holder) 10a to form an optical lens set (or assembly) 1a while the holding ring 10a is made from metal or plastic material. Thus the lens 20a is aligned with a central axis (optical axis) of the optical lens module. Moreover, by an actuator, the holding ring 10a (or the optical lens set 1a) moves inside the optical lens module so as to achieve zoom in/zoom out, as shown in U.S. Pat. Nos. 7,312,933, 7,095,572, US2007/0024989 and JP3650594.

A conventional way of assembly the plastic material or glass optical lens 20a in the holding ring 10a is shown in FIG. 1. For the purpose of glass optical lens assembly, design a holding ring 10a according to shape of the outer periphery 22a of the optical lens 20a such as round or rectangular shape. Then the optical lens 20a is set into a preset cavity of holding ring 10a for being located, glued the optical lens 20a and holding ring 10a. The glue is UV glue that requires a curing process such as being radiated in a UV curing oven for curing. Due to compact size of the optical lens 20a, the optical surface 21a is easy to get scratched or attach with the glue (flow) when the optical lens 20a is located and assembled by automatic or manual gluing. Thus the processes take time and the yield rate is poor. The curing process of the UV curing glue between the glass lens 20a and the plastic material holding ring 10a is especially difficult. Moreover, the curing in the UV curing oven takes long time and the yield rate is poor. Thus the cost is unable to be reduced, as prior arts disclosed in JP3791615, JP06258562, U.S. Pat. No. 7,224,542 and US 2007/0047109.

A technique that places an insert (metal part) in a mold cavity and then formed an article by injection molding process is so called molding insert injection molding method. The insert is set into a mold cavity of a preset mold. Then inject melt plastic material (or rubber) to fill a preset molding area (mold cavity) and cover whole or part of the molding insert. After cooling and curing, the product is released from the mold. Such manufacturing method is applied broadly in electric elements, connector, mechanical parts and LED, as disclosed in U.S. Pat. No. 5,923,805, TWM313317, and JP07120610 etc. While manufacturing a housing (casing) with plastic material lens by such method, the housing is used as an molding insert and put into a mold cavity. Then a plastic material lens is made by plastic material injection and is integrated with the housing. Or use the plastic material optical lens as an molding insert and the housing is made by plastic material injection and integrated with the plastic material optical lens so as to form an integrated housing with plastic material optical lens, as shown in TW 0528279 and U.S. Pat. No. 6,825,503. Refer to JP62251113, the glass plate is used as a molding insert and is covered by plastic material so as to form a window glass or other parts. Refer to U.S. Pat. No. 6,710,945, by using two injection holes for plastic material injecting, a molded lens and a lens holder are molded by injection sequentially. Or use infrared glass as the molding insert and produce a mount covering the infrared glass by injection molding. Refer to U.S. Pat. No. 7,332,110, in a press molding, the eyeglass frame is used as a molding insert and is placed into a mold cavity. The preform of the plastic material lens is heated to a melt status and then the soft preform is turned into the shape of the cavity by heating and pressing of the mold Thus the preform becomes a lens and integrated with the eyeglass frame to form an eyeglass. However, this press molding approach is unable to be applied to a manufacturing process that integrated the glass lens with the plastic material holding ring. Once the plastic material holding ring is used as a molding insert, the softening point of the optical glass is about 500° C. that is far more higher than the deformation temperature such as 80° C. of the plastic material holding ring. Thus when the temperature of the mold achieves the softening point of the optical glass, the plastic material holding ring has already deformed and unable to be molded. Therefore, the press molding is unable to be applied to mass production of the product that uses a plastic material holding ring as a molding insert and glass as molding material.

In addition, as to manufacturing of the lens module revealed in US2009/0059398, an optical lens, an alignment fixture and a sensor are mounted into a mold and then inject plastic material to form a lens module. Or as shown in FIG. 2, as shown in TWM337077, two optical glass lenses 20b, two light shields 30b, a spacer 40b are used as a molding insert to be mounted into molds 31b, 32b in turn. Then a lens holder together with the above molding inserts being covered form a lens module by plastic material injection molding or press molding. However, such technique is unable to be used in the stacked lens submodule already being assembled. Because the stacked lens submodule is an integrated part and is unable to be released into each single element to be set into a mold. Moreover, the optical axis of the optical lenses 20b, optical elements 30b, 40b (shields and spacer) are difficult to be aligned with one another. It takes time and efforts for alignment of the optical axis and this leads to low production rate and poor precision.

For the purpose of assembly the stacked lens submodule with lens holder to form an optical lens module, due to requirement of high precision of the optical lens modules, the assembly precision between lens holder and stacked lens submodule is needed higher than conventional technique. The alignment precision between the stacked lens submodule and the lens holder affects the image resolution of the lens module. Therefore, there are needs to develop a new technique that mass-produces optical lens modules with higher alignment precision by simplified manufacturing processes.

SUMMARY OF THE INVENTION

Therefore it is a primary object of the present invention to provide a lens holder for stacked lens module and a manufacturing method thereof. A stacked lens submodule is used as a molding insert put into a mold cavity. By injection molding or press molding of the molding insert, an integrated lens module having a stacked lens submodule and a lens holder is formed and is applied to assembled lenses of LED light sources/Solar Conversion Systems or optical lenses of cameras/ mobile phone cameras. The stacked lens submodule includes at least one optical lens and optical elements stacked and assembled by glue. The optical elements include one of the followings or their combinations: an optical lens, a spacer, an aperture, a cover glass, an infrared (IR)-cut glass, an image sensor, and so on. The glue can be thermoset adhesive or ultraviolet curing adhesive.

The lens holder of the present invention features on that: the lens holder includes a plurality of clamp chambers and/or alignment groove formed by demolding of clamps and/or alignment fixture of a mold. The stacked lens submodule is aligned and mounted by the clamps and/or alignment fixture of the mold so that the optical axis of the stacked lens submodule is aligned with the optical axis of the molded lens holder.

An injection molding method of a lens holder according to the present invention includes following steps:

S1: provide a stacked lens submodule;

S2: provide an injection mold of a lens holder having an upper mold and a lower mold while the lower mold is disposed with at least three clamps that are aligned with the optical axis relatively so that the stacked lens submodule can be aligned and clamped in the clamps;

S3: mount the stacked lens submodule in the upper mold and the lower mold to be aligned and fixed by the clamps;

S4: heat plastic material to preset temperature and inject the plastic material through a feeding nozzle into the mold cavity so as to form a lens holder with a plurality of clamp chambers formed by demolding of the clamps;

S5: release the upper mold and the lower mold to release a stacked lens module after cooling and curing of the plastic material.

A press molding method of the lens holder according to the present invention includes following steps SS1 to SS5.

SS1: provide a stacked lens submodule;

SS2 provide an injection mold of a lens holder having an upper mold and a lower mold while the lower mold is disposed with at least three clamps that are aligned with the optical axis relatively so that the stacked lens submodule can be aligned and clamped in the clamps;

SSS3: mount the stacked lens submodule in the upper mold and the lower mold to be aligned and fixed by the clamps;

SS4: set plastic material with preset weight (perform) into a preset area between the upper mold and the lower mold for molding of the lens holder; heat the mold to a preset temperature so as to make the plastic material melt; then apply pressure to the upper mold and the lower mold of the mold so that the melted plastic material flows into the mold cavity to form a lens holder with clamp chambers;

SS5: release the upper mold and the lower mold to release a stacked lens module after cooling and curing of the plastic material.

It is another object of the present invention to provide a lens holder of a stacked lens module and a manufacturing method thereof. The lens holder further includes at least one alignment groove that is formed by demolding of an alignment fixture (such as alignment pin) on the mold (such as the upper mold). Thus the optical axis of the submodule is aligned with a central axis of the molded lens holder, without shift. The manufacturing method of the lens holder of a stacked lens module includes following steps:

SSS1: provide a stacked lens submodule,

SSS2: provide a mold of a lens holder having an upper mold and a lower mold while the lower mold is disposed with at least three clamps and the upper mold is arranged with at least three alignment fixtures such as alignment pins; the clamps and the alignment fixtures are relatively aligned with an optical axis;

SSS3: mount the stacked lens submodule in mold cavity to be fixed by the clamps of the lower mold and pressed tightly by the alignment fixture such as alignment pins of the upper mold so as to prevent oblique position of the stacked lens submodule in following process;

SSS4: inject plastic material into a mold cavity (or set perform into a preset area of mold cavity and press the mold) so as to form a lens holder in the mold cavity by injection molding or press molding;

SSS5: release the upper mold and the lower mold after cooling and curing of the plastic material to release a stacked lens module having the lens holder and integrated with the stacked lens submodule.

DETAILED DESCRIPTION OF THE PREFERRED EMBODIMENT

Embodiment One

Figure 7:
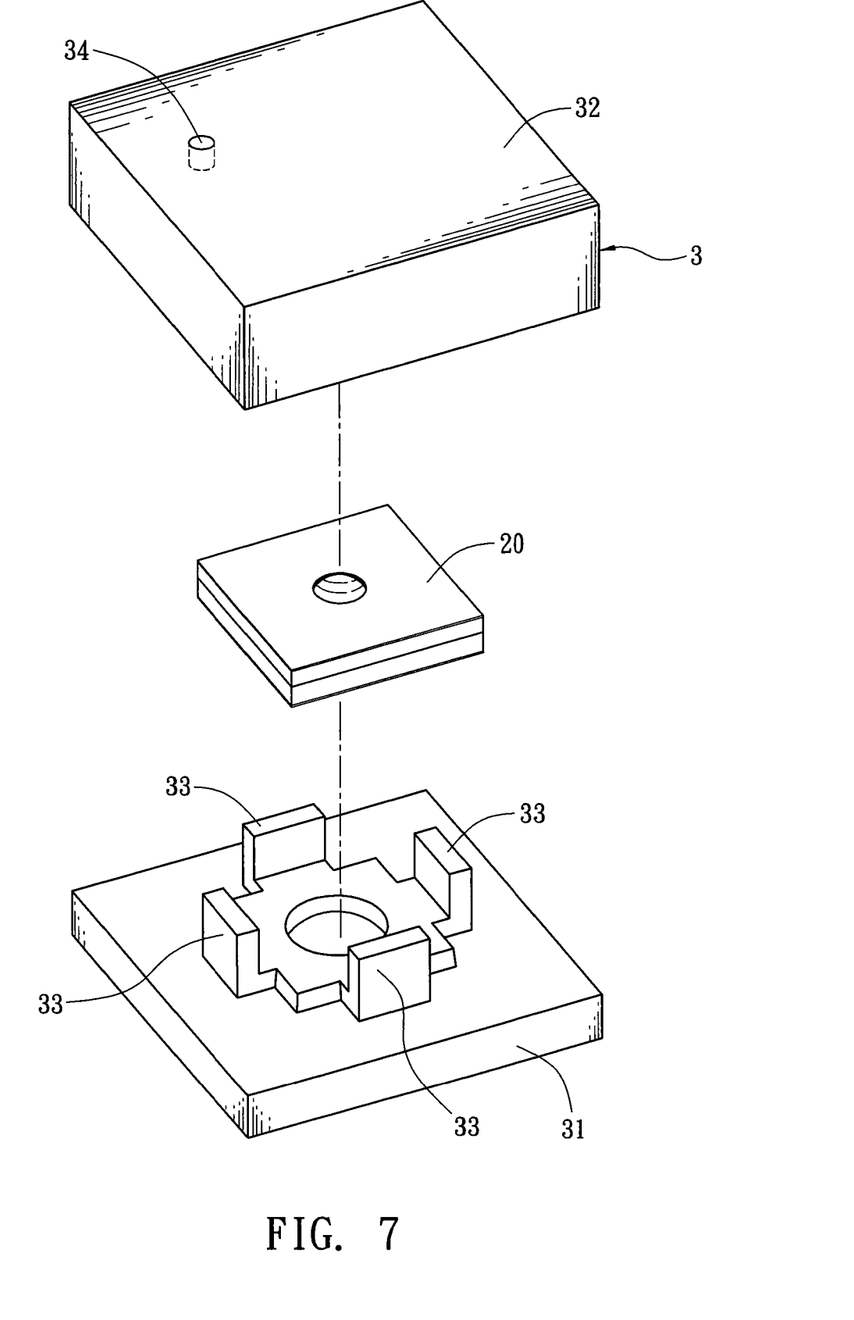
FIG. 7 shows a schematic view of the mold and molding the lens holder of the embodiment in FIG. 3.
Figure 11:
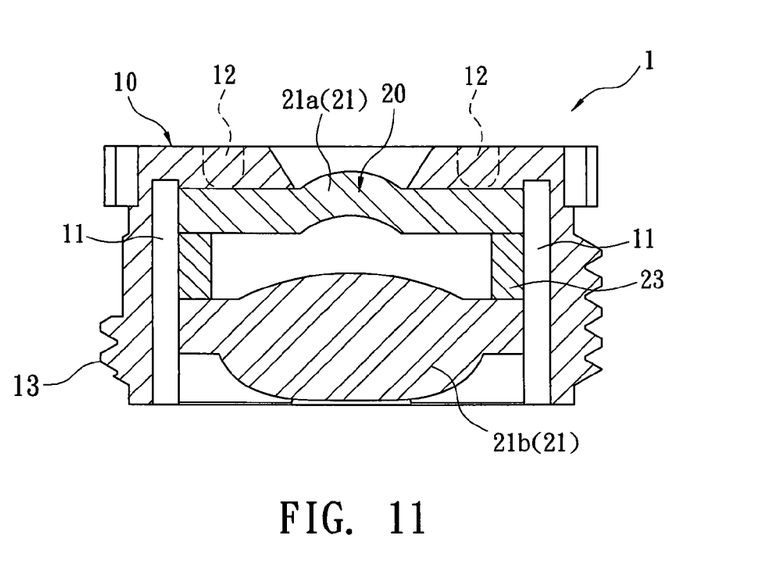
FIG. 11 is a cross sectional view of the embodiment in FIG. 9 along a line 11-11.
Figure 12:
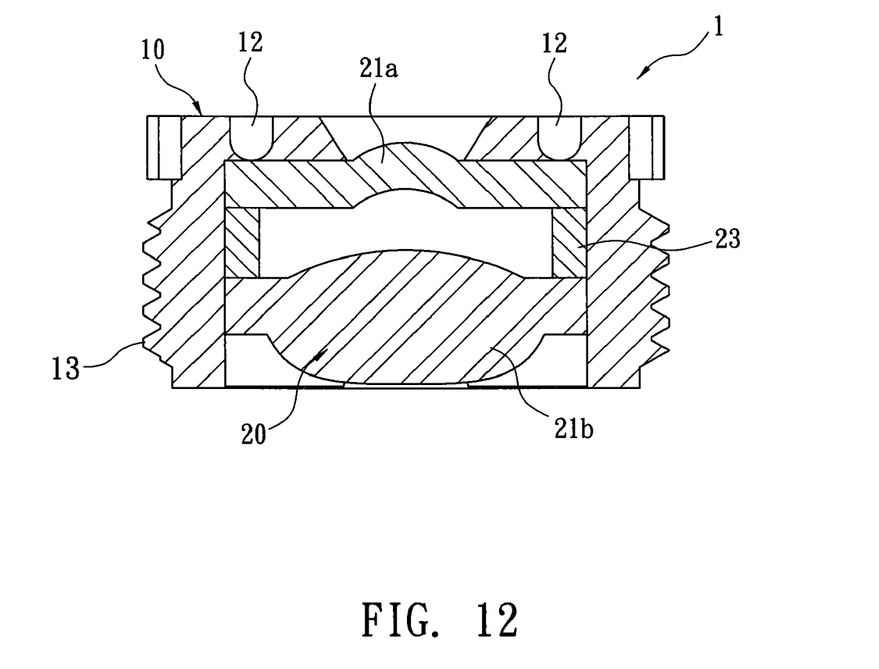
FIG. 12 is another cross sectional view of the embodiment in FIG. 9 along a line 12-12.

Refer from FIG. 3 to FIG. 6, a lens holder of a rectangular stacked lens module of camera lenses and a manufacturing method thereof. The rectangular stacked lens module 1 is produced by a rectangular stacked lens submodule 20 applied as a molding insert. The molding insert (rectangular stacked lens submodule 20) is put into a cavity of a mold 3, as shown in FIG. 7. By injection or press molding of the embedded molding insert, a lens module 1 integrated with the rectangular stacked lens submodule 20 and having a rectangular lens holder 10 is formed. The rectangular stacked lens submodule 20 includes at least one rectangular optical lens 21 and related optical elements stacked and glued with one another. The rectangular stacked lens submodule 20 in this embodiment consists of two optical lenses 21a, 21b, apertures 22, and a spacer 23. Also, the stacked lens submodule may further include other optical elements, such as optical lens, spacer, cover glass, or IR-cut glass as shown in FIG. 11, FIG. 12, and an image sensor (not shown in figure).

Figure 4:
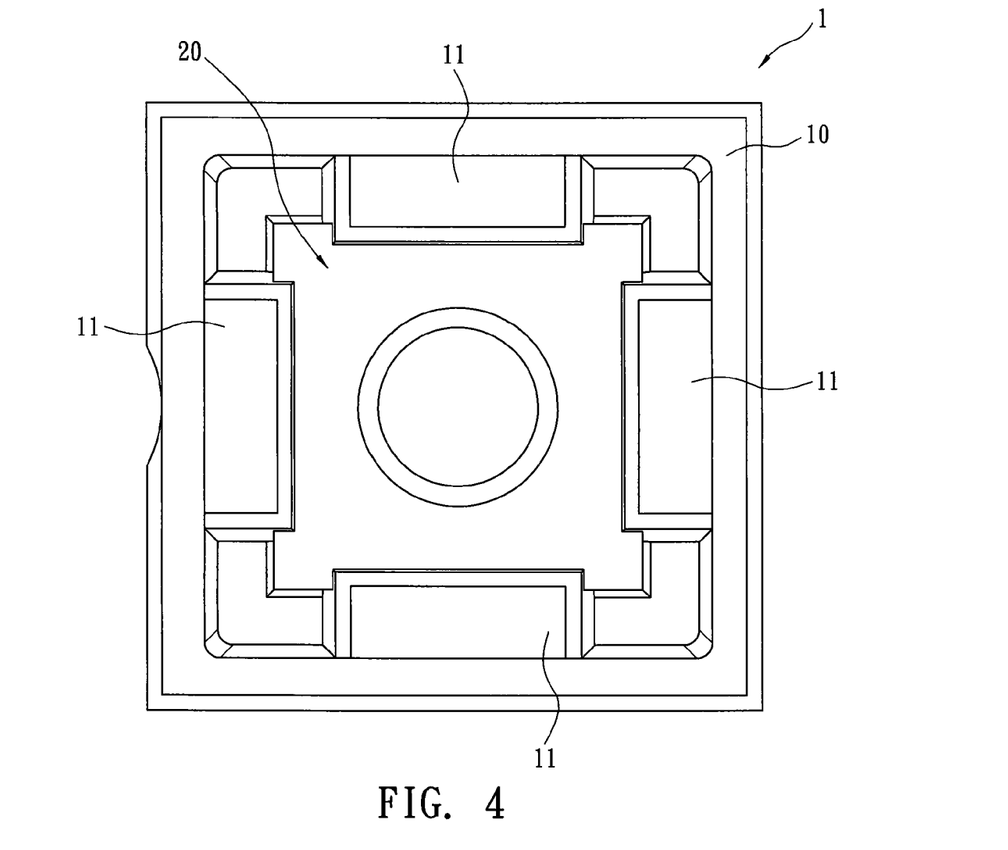
FIG. 4 is a bottom view of the embodiment in FIG. 3.
Figure 5:
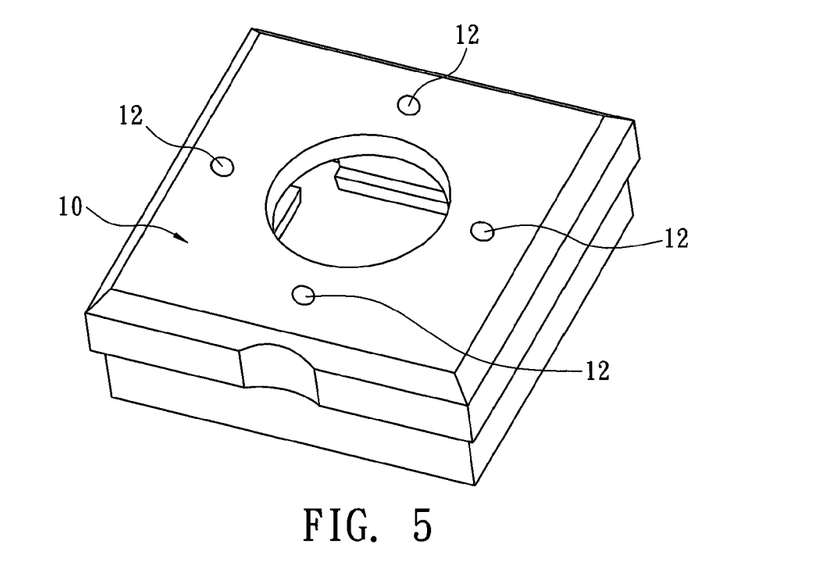
FIG. 5 is a top view of the lens holder of the embodiment in FIG. 3.
Figure 6:
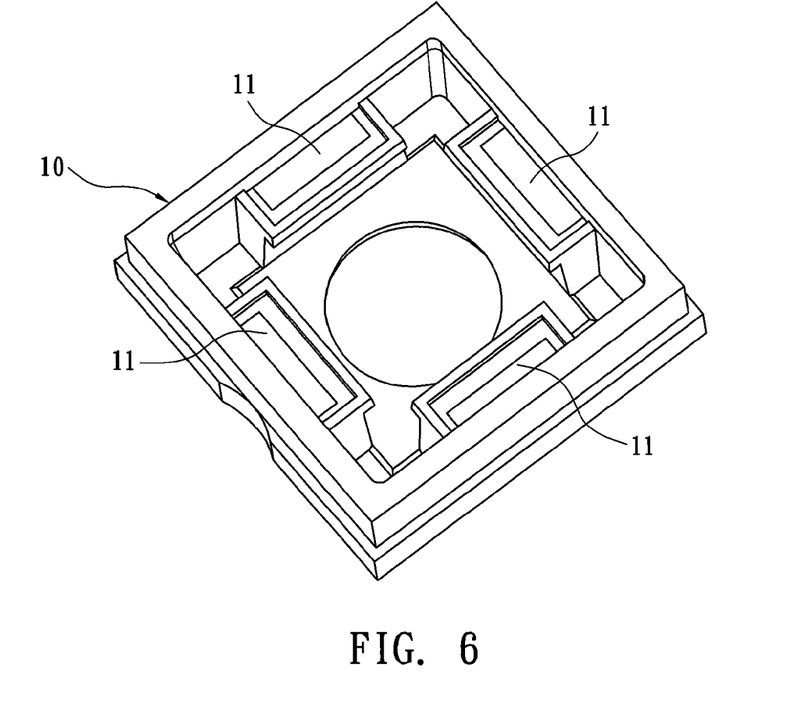
FIG. 6 is a bottom view of the lens holder of the embodiment in FIG. 3

The rectangular lens holder 10 in this embodiment features on that: the rectangular lens holder 10 is disposed with a plurality of clamp chambers 11 formed by demolding of clamps 33 arranged at the lower mold 31, as shown in FIG. 4. During injection molding or press molding processes, plastic material is injected or set perform into a mold cavity between the lower mold 31 and the upper mold 32 to cover the periphery of clamps 33, where the rectangular stacked lens submodule 20 is fixed. After being molded, the lower mold 31 and the upper mold 32 are released so that the clamps 33 are released together with the lower mold 31 (demolding) to form the clamp chambers 11. Moreover, the clamp chambers 11 align with the optical axis. Thus when the rectangular stacked lens submodule 20 is put into the mold 3 as a molding insert, as shown in FIG. 7, the rectangular stacked lens submodule 20 is aligned and fixed by the clamps 33 to be clamped among, integrated with clamp chambers 21 of the molded rectangular lens holder 10, and aligned with the central axis (optical axis) of the rectangular lens holder 10.

Refer to FIG. 7, an injection molding method of a rectangular lens holder 10 in this embodiment according to the present invention includes following steps:

S1: provide a rectangular stacked lens submodule 20 as a molding insert; the rectangular stacked lens submodule 20 includes at least one optical lens and other optical elements stacked and glued with one another while the glue is thermoset glue or ultraviolet (UV) curing glue;

S2: provide an injection mold 3 of a rectangular lens holder 10 that includes a lower mold 31 and an upper mold 32 while the lower mold 31 is disposed with four clamps 33 that are aligned with an optical axis relatively;

S3: set the rectangular stacked lens submodule 20 into the lower mold 31 and the upper mold 32 to align and fix the rectangular stacked lens submodule 20 by the four clamps 33 of the lower mold 31;

S4: heat plastic material to preset temperature and inject the plastic material through an feeding nozzle 34 of the mold 3 to form the rectangular lens holder 10 by injection molding; the rectangular lens holder 10 is integrated with the rectangular stacked lens submodule 20 and the four clamp chambers 11 in the lens holder formed by the four clamps 33;

S5: release the lower mold 31 and the upper mold 32 after cooling and curing of the plastic material to release an integrated rectangular stacked lens module 1 having the lens holder 10.

The rectangular lens holder 10 of this embodiment can also be produced by press molding. The manufacturing method of the press molding and related steps are similar to those of the injection molding while the main difference between them is in the step S4: put plastic material with preset weight (perform) into a mold cavity formed by the lower mold 31 and the upper mold 32, heat the mold 3 to preset temperature for melting of the plastic material and apply pressure to the lower mold 31 and the upper mold 32 so that the melt plastic material flows into the mold cavity for molding to form the rectangular lens holder 10 with clamp chambers 11.

Figure 8:
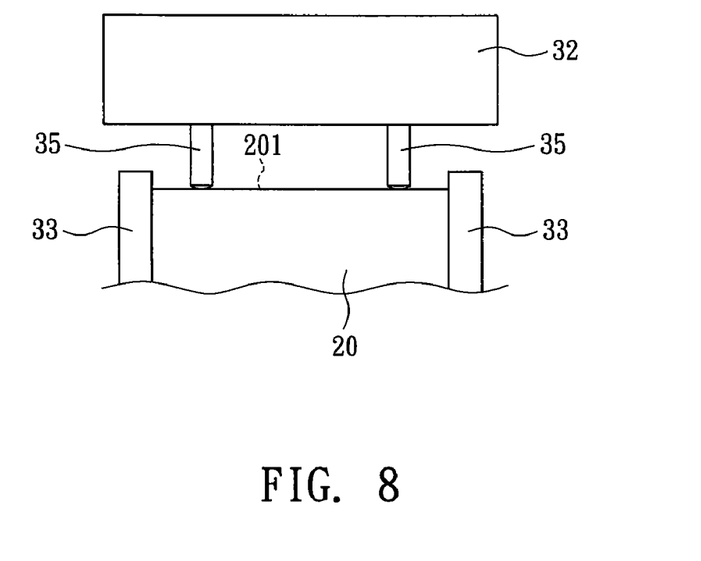
FIG. 8 shows a schematic view of an upper mold with alignment fixture of the embodiment in FIG. 3.
Figure 9:
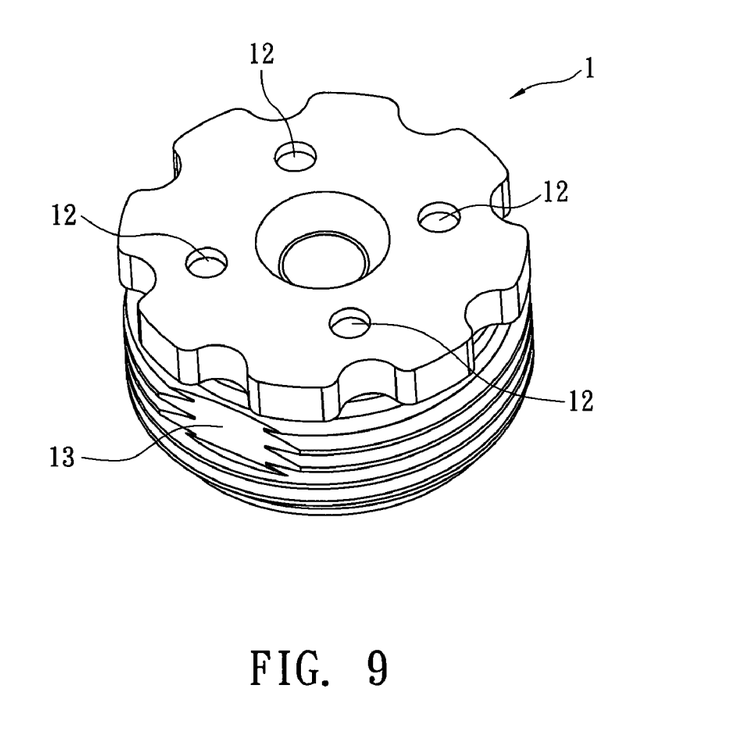
FIG. 9 is a perspective view of an embodiment applied to a round stacked lens module of camera lenses according to the present invention.
Figure 10:
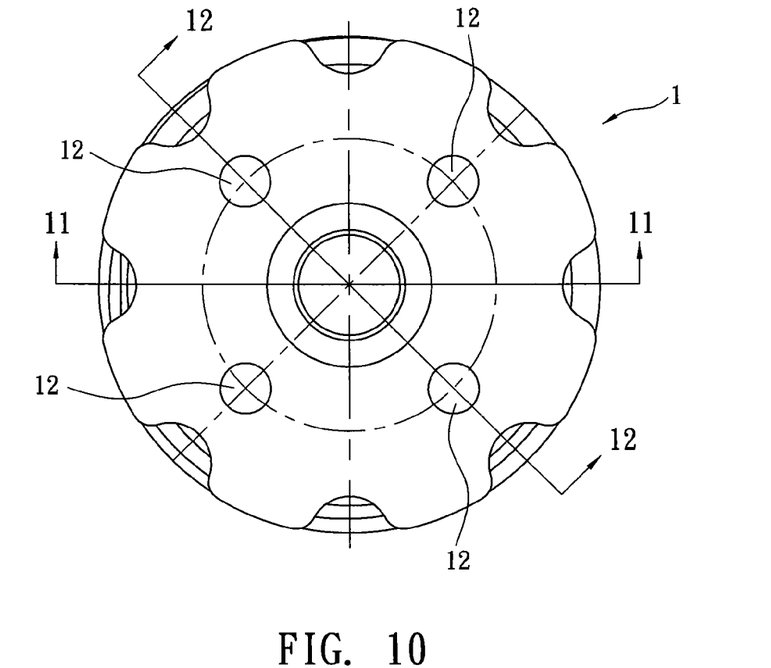
FIG. 10 is a top view of the embodiment in FIG. 9.

The rectangular lens holder 10 can further include an alignment groove 12 corresponding to an alignment fixture 35 disposed on the upper mold 32 so as to prevent oblique position of the rectangular stacked lens 20 during injection or/press molding processes and make the optical axis of the submodule 20 align with the central axis of the molded lens holder 10 exactly. The alignment fixture 35 of the upper mold 32 can be a plurality of alignment pins with the same length and arranged circularly and symmetrically, such as four alignment pins shown in FIG. 8 (only two can be seen in the figure). When the lower mold 31 and the upper mold 32 are closed, the alignment fixture 35 (four alignment pins) presses the rectangular stacked lens submodule 20 tightly so as to prevent oblique position of the rectangular stacked lens submodule 20. Refer to FIG. 8, the four alignment pins evenly lean against an upper surface 201 of non-optical area of the rectangular stacked lens submodule 20 and form alignment grooves 12 of the molded rectangular lens holder 10.

The injection/press molding method of this rectangular lens holder 10 with at least one alignment fixture 35 includes the steps similar to those of the injection molding method mentioned above. The difference between them is in that: the step S3 further includes a step of: setting the rectangular stacked lens submodule 20 between the upper mold 32 and the lower mold 31 to be aligned and fixed by four clamps 33 of the lower mold 31. Then by the alignment fixture 35 (such as four alignment pins) of the upper mold 32 evenly against the upper surface 201 of non-optical area of the rectangular stacked lens submodule 20, the rectangular stacked lens submodule 20 and the integrated rectangular lens holder 10 are precisely aligned with the optical axis.

Embodiment Two

Refer from FIG. 9 to FIG. 13, this embodiment is a lens holder of a round stacked lens module applied to mobile phone cameras and a manufacturing method thereof. A round stacked lens module 1 of this embodiment uses a round stacked lens submodule 20 as a molding insert that is put into a mold cavity, as shown in FIG. 7. By injection molding or press molding of the molding insert, a lens module 1 having a round lens holder 10 and integrated with the round stacked lens submodule 20 is formed. The round stacked lens submodule 20 in this embodiment includes two round optical lenses 21a, 21b and a spacer 23.

Figure 14:
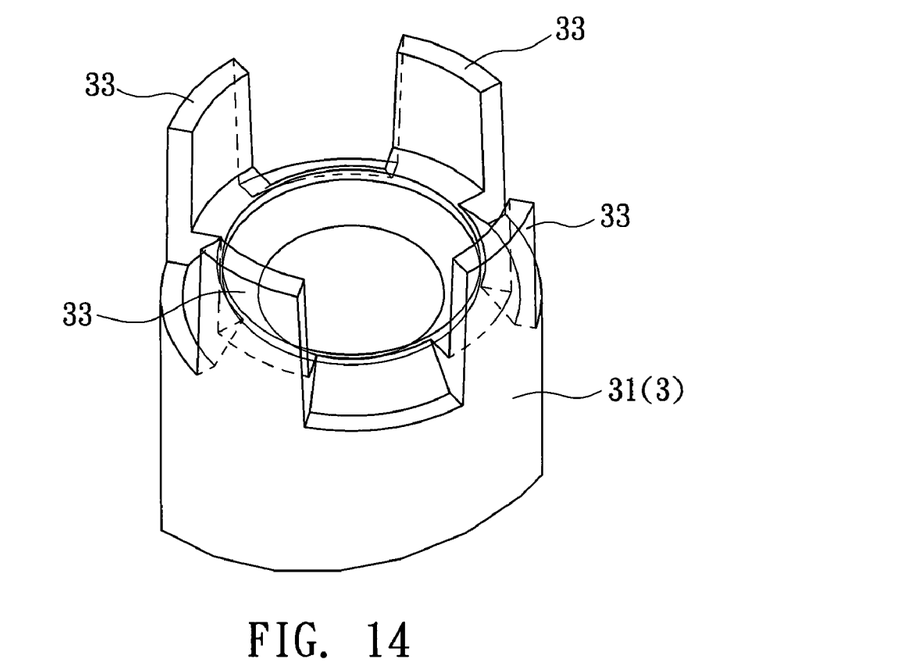
FIG. 14 shows a lower mold with clamps of the embodiment in FIG. 9.
Figure 15:
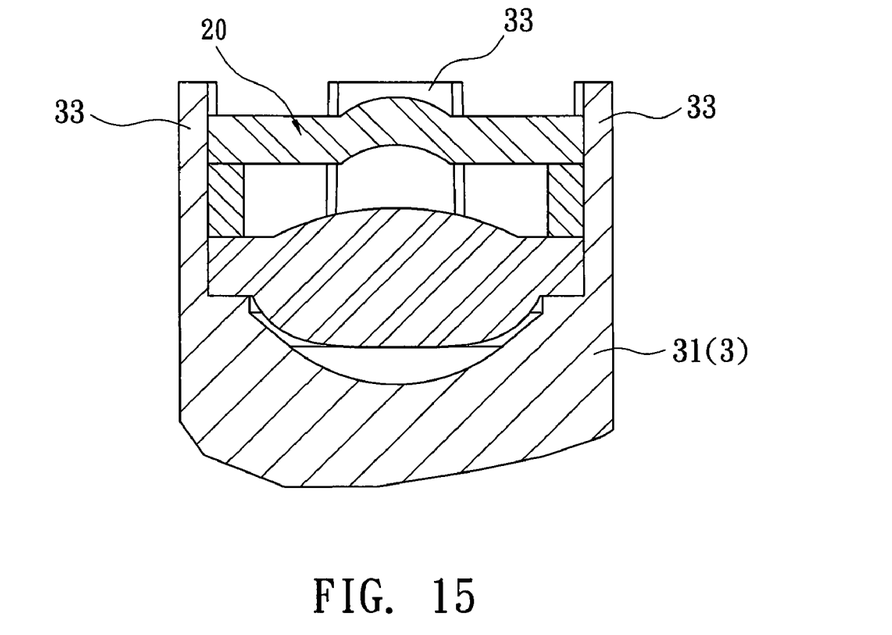
FIG. 15 is a schematic drawing showing a stacked lens submodule clamped in the clamps of the embodiment in FIG. 9.

The round lens holder 10 of the present invention features on that: the round lens holder 10 is disposed with a plurality of clamp chambers 11, as shown in FIG. 11. Similar to the embodiment one, the clamp groove 11 is formed by demolding of each clamp 33 (refer to FIG. 14) arranged at the lower mold 31 during injection or/ press molding processes. The clamps 33 are aligned with the optical axis. Refer to FIG. 14, the four arched clamps 33 are arranged in a circular form. Thus when the round stacked lens submodule 20 is put into the lower mold 31 as a molding insert, as shown in FIG. 15, the round stacked lens submodule 20 is aligned and fixed by the clamps 33, clamped among each clamp groove 21 of the molded round lens holder 10 and integrated with the clamp chambers 21. Moreover, the round stacked lens submodule 20 is aligned with the optical axis of the lens holder.

The round lens holder 10 of this embodiment further includes an alignment groove 12 corresponding to an alignment fixture 35 disposed on the upper mold 32 (as shown in FIG. 8) for preventing oblique position of the optical axis of the round stacked lens submodule 20 during injection or press molding processes and enabling the round stacked lens submodule 20 aligning with the optical axis of the round lens holder 10. The alignment fixture 35 of the upper mold 32 can be a plurality of alignment pins arranged symmetrically and circularly that has the same function with those in the embodiment one (as shown in FIG. 8). Corresponding alignment grooves 12 are also formed on the molded round lens holder 10.

Figure 13:
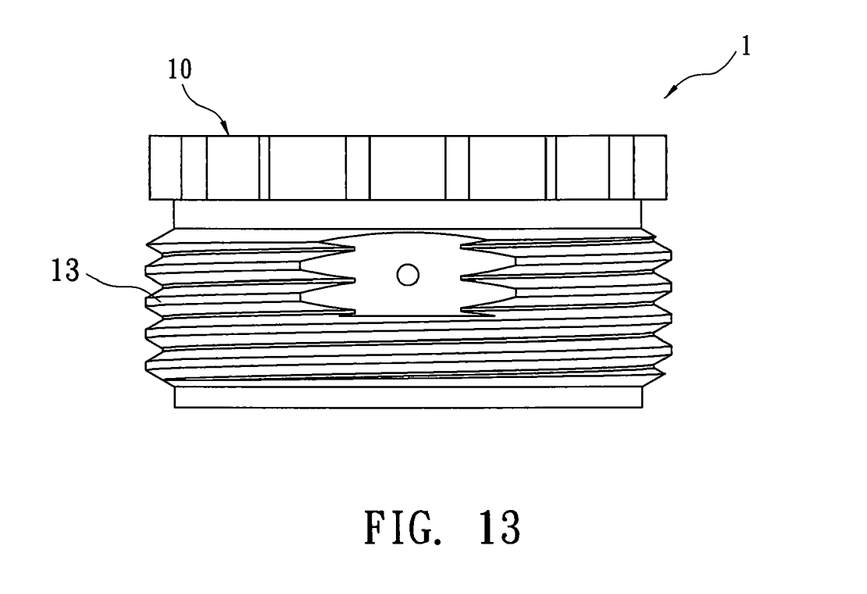
FIG. 13 is a side view of the embodiment in FIG. 9.

The injection molding method of such lens holder 10 consists of the steps similar to those of the embodiment one. Moreover, for convenience or requirement of the assembly of the stacked lens module 1, an integrated external thread 13, as shown in FIG. 13 is formed on an outer surface of the round lens holder 10.

In summary, the present invention has at least the following advantages:

(1) The manufacturing method of conventional lens module has been improved by the present invention. The processes of the method are simplified, the yield rate is increased, the cost is reduced and the possibility of mass-production of the stacked lens modules is improved.

(2) The stacked lens module produced by the method of the present invention can be packed in the lenses more easily, especially suitable for small cameras and mobile phone cameras. Thus the possibility of mass-production of the lens is increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A lens holder for a stacked lens module formed by a molding insert and molding mold by injection or press molding, the stacked lens submodule being used as the molding insert, wherein the lens holder is formed around the stacked lens submodule, integrated with the stacked lens submodule, and has a plurality of clamp chambers formed by a molding mold and a plurality of alignment grooves formed by the molding mold for injection molding or press molding which are disposed with a plurality of alignment fixtures, so as to make the stacked lens submodule in the lens holder align with an optical axis of the lens holder and form corresponding alignment grooves on the lens holder after demolding;

wherein the stacked lens submodule has at least one optical lens and at least one optical element stacked and glued with each other; and wherein the molding mold for injection molding or press molding is disposed with a plurality of clamps that make the stacked lens submodule align with the optical axis and form corresponding clamp chambers on the lens holder after releasing the molding mold.

2. The device as claimed in claim 1, wherein the optical element of the stacked lens submodule is at least one of an optical lens, a spacer, an aperture, a cover glass, an infrared-cut glass, an image sensor.

3. The device as claimed in claim 1, wherein the molding mold includes an upper mold and a lower mold while the clamps are disposed on the upper mold or the lower mold.

4. The device as claimed in claim 3, wherein there are at least three clamps.

5. The device as claimed in claim 1, wherein the molding mold includes an upper mold and a lower mold while the alignment fixture is disposed on the upper mold or the lower mold.

6. The device as claimed in claim 5, wherein there are at least three alignment fixtures.

* * * * *